July 27, 1926.

E. H. FREIBURGHOUSE

DYNAMO ELECTRIC MACHINE

Filed Oct. 24, 1924

1,594,058

Inventor:
Edward H. Freiburghouse,
by
His Attorney.

Patented July 27, 1926.

1,594,058

UNITED STATES PATENT OFFICE.

EDWARD H. FREIBURGHOUSE, OF SCHENECTADY, NEW YORK, ASSIGNOR TO GENERAL ELECTRIC COMPANY, A CORPORATION OF NEW YORK.

DYNAMO-ELECTRIC MACHINE.

Application filed October 24, 1924. Serial No. 745,718.

The present application is a continuation in part of my prior application, Serial No. 662,122, filed Sept. 11, 1923.

My invention relates to dynamo electric machines and particularly to such machines of the alternating current type, and has for its object a novel arrangement and construction of the rotatable field member of such a machine whereby the efficiency of such machines is increased and the machine operates much cooler.

It has been general practice for about fifteen years both in the United States and abroad to provide large turbo alternators with substantially smooth cylindrical revolving field members which are made out of solid steel forgings and which are ventilated by forcing cooling fluid into the air gaps between the stationary armature and revolving field member. They are made of such forgings because of the large stresses occurring in them at the high peripheral speeds at which they run. Such field members have been the limiting feature of such machines since they usually become very hot.

I have found that by providing the rotor of such machines with circumferentially extending grooves, a very great reduction in the temperature rise of the rotor winding is obtained, and at the same time, the temperature rise of the armature winding is reduced and the efficiency of the machine increased.

Figure 1:
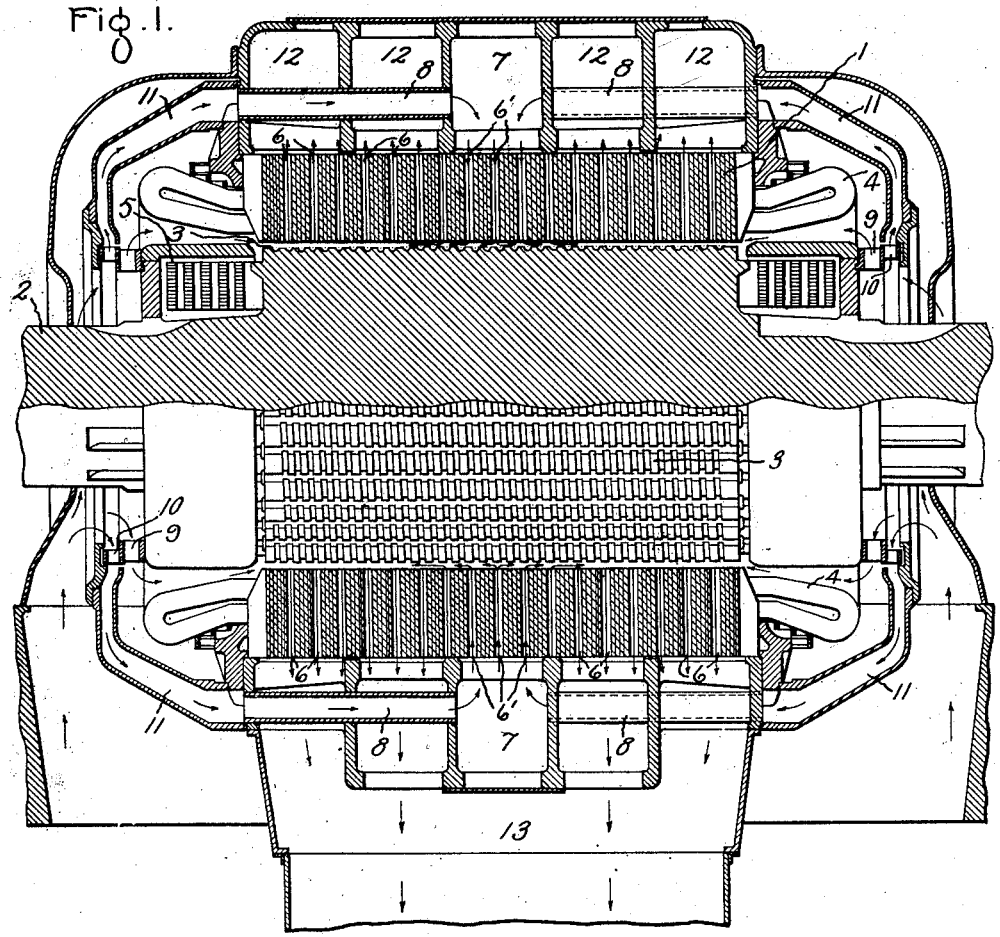
Figure 2:
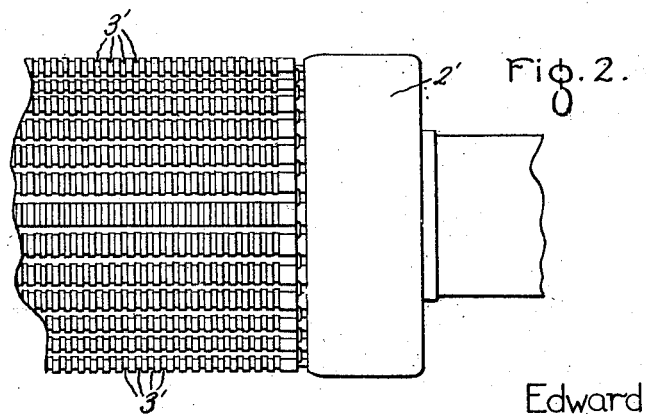

For a better understanding of my invention, reference may be had to the following description taken in connection with the accompanying drawing, in which Fig. 1 is a view, partly in section, of a dynamo electric machine embodying my invention, and Fig. 2 is a partial view of a rotor embodying a slightly different form of groove in the surface thereof.

Referring to the drawing, 1 is a stationary armature or stator of an alternating current dynamo electric machine and 2 is the rotatable field member or rotor thereof. The rotor has circumferentially extending grooves 3 formed in its surface. The stator 1 is a laminated structure having a cylindrical periphery and provided with slots in which is placed an alternating current winding 4. The rotor 2 is substantially unlaminated and cylindrical in form and is provided with an exciting winding 5 arranged in slots therein. The exciting winding 5 is supplied with the usual direct current excitation through collector rings (not shown).

The machine is ventilated by forcing cooling fluid into the air gap between the stator and rotor and over the grooved surface of the rotor. I have illustrated in Fig. 1 of the drawing the particular ventilating arrangement of the United States patent to Holcombe, No. 1,269,537, dated June 11, 1918.

In this ventilating arrangement, cooling fluid is delivered into the air gap from both ends and also delivered to the air gap at the middle of the rotor. The stator has radial ventilating spaces 6 and 6'. A chamber 7 is provided about the outer periphery of the ventilating spaces 6' and cooling fluid is conveyed thereto by conduits 8. At each end of the rotatable member there is provided a ventilating member which comprises inner and outer fan members 9 and 10. The inner fan members 9 force cooling fluid into the air gap between the rotor 2 and stator 1, over the grooved surface of the rotor and to the inner periphery of the ventilating spaces 6. The outer fan members 10 deliver cooling fluid to the passages 11 and thereby to the conduits 8 from whence it is discharged into the chamber 7. The air then flows through the ventilating spaces 6' in the stationary member and is discharged into the air gap between the rotatable and stationary members. The streams of air thus combined in the air gap pass through the ventilating spaces 6, escaping from the outer periphery thereof into chambers 12 and thence it is conveyed from the machine by the outlet duct 13.

The grooves 3 in Fig. 1 of the drawing are cut in the surface of the rotor and form a continuous spiral, but equally good results are obtained with the construction shown in Fig. 2 of the drawing, in which the circumferential grooves 3' of the rotor 2' are circular instead of spiral. The rotor 2 is shown as made of solid steel which, as pointed out above, is usual in high speed alternating current dynamo electric machines, such as turbine driven alternators. I have found it advantageous to cut grooves in the rotor of such machines of 10,000 kw. output and above of about ¼ inch wide, ⅛ inch deep and space them so that the adjacent edges of the grooves are about ¼ inch apart, so that dirt will not collect in them and impair their efficiency so far as ventilating is concerned, and so that air will effectively enter them in its passage through the air gap. My invention is, however, not limited to any particular width or spacing of grooves.

When the rotatable field member or rotor of an alternating current dynamo electric machine revolves within the armature or stator, the magnetic flux density in the rotor surface opposite a stator tooth is greater than it is in the surface opposite a stator slot. Since the rotor moves relatively to the stator, the surface of the rotor cuts a pulsating flux which causes eddy currents to flow therein. These currents alternate at a comparatively high frequency, that is, at stator tooth frequency, and because of their high frequency penetrate effectively only a few hundredths of an inch into the rotor surface, the depth of penetration being determined by the permeability and conductivity of the steel out of which the rotor is made, and also by the frequency of the flux wave. These eddy currents cause a loss in efficiency and produce heat in the rotor core. This loss, caused by the variation in permeance of the inner periphery of the stator core, occurs not only at any load under which the machine is operating, but also at no load, and depends upon the magnitude of the main flux. This loss is greatest when the stator is provided with open slots, but occurs to some extent in machines in which the stator has semi-closed or totally closed slots.

Even if an alternating current machine is built with a closed slot stator, that is, one in which the inner surface of the stator is smooth, eddy current losses will occur in the rotor surface, caused by the current flowing in the stator windings under load conditions. When current flows in the stator conductors, variations of flux will occur in each element of the rotor surface due to the flux produced by the flow of the stator current. This variation of flux induces eddy currents in the rotor surface. These eddy current losses known as "pole face" losses occur not only in the case where the stator slots are of the closed type but also occur in machines in which the stator is provided with semi-closed or open slots. These pole face currents flow in the surface of the rotor in an axial direction in the rotor surface through a resistance determined by the effective depth of penetration and by the length of the surface measured in the direction of the axis of the machine. These eddy currents tend to flow in the surface of the rotor in the direction of the axis of the rotor, and by providing the surface of the rotor with circumferentially extending grooves as shown in Figs. 1 or 2, the length of the path of these eddy currents is substantially increased, thereby increasing the resistance of the path of these eddy currents, which in turn substantially decreases these eddy currents and consequently reduces the loss caused thereby. The reduction of this loss in the rotor causes the rotor to operate considerably cooler than it would if it were not provided with these grooves.

These grooves also increase the cooling surface of the rotor and thereby decrease the operating temperature of the rotor winding. It is estimated that forty or fifty per cent of the total temperature rise of the rotor copper above the ingoing air is due to the temperature drop between the surface of the rotor and the air forced through the air gap. This temperature drop is inversely proportional to the surface of the rotor exposed to the air in the air gap. Therefore, by grooving the surface of the rotor, the total rotor surface in contact with the cooling air is substantially increased and the temperature drop between the surface of the rotor and the cooling air forced through the air gap is reduced.

Without confining myself to any theory of operation, I believe that the increase in efficiency of a machine provided with my invention is due to the following: First, the reduction in the eddy current loss; second, the increase in the heat radiating surface of the rotor; and third, the reduction in windage loss which will be hereinafter explained.

The air flowing axially between the stator and rotor is thrown by the grooves into a violent turbulent state, which, although there results a slight energy loss in the air, also causes a reduction in the rate of air flow. This reduction in the rate of air flow results in a reduction of the windage loss. This turbulence also causes an increased rate of heat transfer from the metal surfaces to the air in the air gap by convection with less drop in temperature at the surface of the rotor. The reduction of the temperature difference between these heat dissipating surfaces and the air, due to turbulency and increased surface, far more than compensate for the reduction in air flow and the slight increase in air temperature. This turbulency thus helps in considerably reducing the temperature at which the rotor operates, and also results in a reduction of the temperature at which the stator operates.

I prefer to use fans driven by the rotor of the machine and which have forwardly curved blades. Such fans do not need to be redesigned for use in connection with a grooved rotor. This is due to the characteristics of such fans, namely, when driven at constant speed, they require less power to drive them if the pressure against which they are working is large, than if such pressure is low.

It will therefore be seen, that a machine constructed in accordance with my invention will have less windage losses, less open circuit core loss and less stray load losses than a machine having a smooth rotor, and the stator winding thereof will operate with less temperature rise and the rotor with a considerably less temperature rise than will the stator and rotor of a machine having a smooth rotor.

Actual tests on two 31,250 KVA turbo-alternators, having exactly the same electrical and mechanical design, except that the rotor of one was smooth and the rotor of the other was grooved in accordance with my invention, showed the following:

A reduction in the flow of air from 69,000 cu. ft. per min. for the smooth rotor to 54,000 cu. ft. per min. for the grooved rotor.

A reduction in the windage loss from 337.5 kw. for the smooth rotor to 248 kw. for the grooved rotor.

A reduction in the core loss from 193 kw. for the smooth rotor to 150 kw. for the grooved rotor.

A reduction in the stray load losses from 246 kw. for the smooth rotor to approximately 167 kw. for the grooved rotor.

An increase in the total efficiency from 96.4% for the machine having the smooth rotor to 97.2% for the machine have the grooved rotor.

A reduction in the temperature of the rotor winding from 88° C. for the smooth rotor to 58° C. for the grooved rotor.

A reduction in the temperature rise of the highest reading temperature coil in the stator winding of 7° C. for the grooved rotor machine over that of the smooth rotor machine.

Tests on machines of different ratings have not shown as marked reductions as those in the particular machines set forth above, but they do show a substantial improvement in their operation in the above noted particulars.

I desire it to be understood that my invention is not limited to the particular arrangement shown and described, and I aim in the appended claims to cover all modifications which do not depart from the spirit and scope thereof.

What I claim as new and desire to secure by Letters Patent of the United States, is,—

1. In a dynamo electric machine, a stationary armature comprising a laminated structure having a cylindrical inner periphery and a winding located in slots therein, a substantially unlaminated cylindrical rotatable field member having an exciting winding arranged in slots therein, said field member having circumferentially extending grooves formed in the surface thereof, and means for forcing cooling fluid into the air gap between said stationary armature and said field member and over said grooved surface.

2. In a dynamo electric machine, a stationary armature comprising a laminated structure having a cylindrical inner periphery and a winding located in slots therein, a solid steel cylindrical rotatable field member having an exciting winding arranged in slots therein, said field member having circumferentially extending grooves formed in the surface thereof, and means for forcing cooling fluid into the air gap between said stationary armature and said field member and over said grooved surface.

3. In a dynamo electric machine, a stationary armature comprising a laminated structure having a cylindrical inner periphery and a winding located in slots therein, a cylindrical rotatable field member having an exciting winding arranged in slots therein, said field member having circumferentially extending grooves formed in the surface thereof and means for forcing cooling fluid into the air gap between said stationary armature and said field member and over said grooved surfaces.

In witness whereof, I have hereunto set my hand this 23rd day of October, 1924.

EDWARD H. FREIBURGHOUSE.

---

Certificate of Correction.

It is hereby certified that in Letters Patent No. 1,594,058, granted July 27, 1926, upon the application of Edward H. Freiburghouse, of Schenectady, New York, for an improvement in "Dynamo-Electric Machines," errors appear in the printed specification requiring correction as follows: Page 1, line 92, strike out the article "the"; page 3, line 35, for the word "have" read *having;* and that the said Letters Patent should be read with these corrections therein that the same may conform to the record of the case in the Patent Office.

Signed and sealed this 31st day of August, A. D. 1926.

[SEAL.]

M. J. MOORE,
*Acting Commissioner of Patents.*